(12) United States Patent
Sugiyama

(10) Patent No.: US 8,279,462 B2
(45) Date of Patent: Oct. 2, 2012

(54) INFORMATION PROCESSING APPARATUS AND NOTIFICATION METHOD

(75) Inventor: Hideki Sugiyama, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 2021 days.

(21) Appl. No.: 11/150,169

(22) Filed: Jun. 13, 2005

(65) Prior Publication Data

US 2005/0275885 A1    Dec. 15, 2005

(30) Foreign Application Priority Data

Jun. 14, 2004    (JP) .................................. 2004-176002

(51) Int. Cl.
    *G06F 15/00*    (2006.01)
(52) U.S. Cl. ........................ 358/1.15; 358/1.1; 358/1.14
(58) Field of Classification Search .................. 358/1.1, 358/1.15, 1.13, 1.9, 1.14
    See application file for complete search history.

(56) References Cited

U.S. PATENT DOCUMENTS

| | | | | |
|---|---|---|---|---|
| 5,768,483 | A | * | 6/1998 | Maniwa et al. ............... 358/1.15 |
| 6,567,176 | B1 | | 5/2003 | Jeyachandran et al. |
| 7,154,635 | B2 | | 12/2006 | Oyama |
| 7,272,648 | B2 | | 9/2007 | Kawasaki et al. |

FOREIGN PATENT DOCUMENTS

| | | |
|---|---|---|
| JP | 7-123231 | 5/1995 |
| JP | 10-198637 | 1/1997 |
| JP | 9-91102 | 4/1997 |
| JP | 09091102 | * 4/1997 |
| JP | 10198637 | * 7/1998 |
| JP | 10-240461 | 9/1998 |
| JP | 2000-172467 | 6/2000 |
| JP | 2001-260484 | 9/2001 |
| JP | 2003-91388 | 3/2003 |
| JP | 2003-110619 | 4/2003 |
| JP | 2003-202990 | 7/2003 |

OTHER PUBLICATIONS

English translation, distributed processing computer system.*
English translation, reporting method for print job execution result for network system.*
English translation of JP10198637, Jul. 1998.*
Office Action, dated Sep. 1, 2008, in JP 2004-176002.

* cited by examiner

*Primary Examiner* — King Poon
*Assistant Examiner* — Iriana Cruz
(74) *Attorney, Agent, or Firm* — Fitzpatrick, Cella, Harper & Scinto

(57) ABSTRACT

In an information processing apparatus capable of direct or indirect communication with a printing apparatus, upon notification of processing status of a printing job, first identification information indicating a log-in user upon generation and transmission of the printing job is obtained. Then, upon reception of notification information indicating a processing state of the printing job from an external apparatus, second identification information indicating a log-in user at that time is obtained. It is determined whether or not the notification information is to be notified by comparing the first identification information obtained regarding a printing job corresponding to the received notification information with the second identification information obtained upon reception of the notification information.

9 Claims, 16 Drawing Sheets

INFORMATION PROCESSING APPARATUS AND NOTIFICATION METHOD

FIELD OF THE INVENTION

The present invention relates to an information processing apparatus and a notification method preferably applicable to a print system having a function of notifying the completion of print processing to a host device.

BACKGROUND OF THE INVENTION

A print system, where a printing job is sent from an information processing apparatus to a printing apparatus, then notification or the like on the result of printing is received from the printing apparatus, and the notification or the like is presented to a user, is realized. For example, Japanese Patent Application Laid-Open No. 09-091102 discloses a print system having a client, a print server and a printer, where the processing status of a printing job is notified to the client.

According to Japanese Patent Application Laid-Open No. 09-091102, to notify a message such as a notification of completion of printing job to an appropriate printing-job originator at appropriate timing, the following construction has been proposed. First, a server machine inputs printing jobs outputted from plural client machines, performs queuing, generates job IDs for the respective printing jobs, and stores the generated job IDs, user IDs of the printing jobs and connection IDs. The queued printing jobs are transferred to the printer, then a printer controller generates messages based on the completion status or suspended status of printing jobs, and transfers the messages, with the job IDs, to the server machine via the NIC. The server machine queues the messages including the job IDs received from the printer controller via the NIC in a time-sequential manner. Then the server machine checks the job IDs of the queued messages, specifies job owners from the user IDs and the connection IDs corresponding to the job IDs. If a specified job owner exists on the network, the server machine immediately transfers the message to the corresponding client machine.

Further, according to Japanese Patent Application Laid-Open No. 09-091102, a user name and the like included in a print profile corresponding to each printing job are edited from the client machine, and the edited print profile is re-registered in the server machine.

In recent years, security countermeasures are fortified in the field of print system. For example, upon generation of print data, it is necessary to conceal print information such as user name and document name which might meet one's eye. For this purpose, empting user name and the like described in a printing job, inputting disinformation, and encrypting the user name and the like, have been proposed.

However, as the notification destination of processing status regarding a printing job is determined by using a user ID of the printing job, i.e., the user ID included in the printing job, when the security countermeasures are fortified, an appropriate user ID cannot be obtained. That is, there is a probability that when the result of printing is to be notified to a user based on a user name returned from the printer, the result of printing cannot be notified to an appropriate log-in user.

For example, in a case where a print result notification is displayed if a user name included in a print-completed job obtained from the printing apparatus corresponds with a current host name/log-in user name, the print result notification to an appropriate log-in user cannot be realized due to the above security counter measure.

On the other hand, as the fortified security countermeasure, it may be arranged such that the every notification of print result is disabled. However, in such case, a problem may occur when a user does not notice the completion of printing job or the like. Especially, in a case where the printer is positioned away from the user's computer, there are strong user requests for the printing-job completion notification.

SUMMARY OF THE INVENTION

The present invention has been made in consideration of the above problems, and has its object to enable a print system, where user information included in a printing job transmitted to a printer is deformed in accordance with e.g. fortified security countermeasure, to notify results of various processings on a printing job to an appropriate user.

According to one aspect of the present invention, there is provided a notification method for notifying a processing status of a printing job in an information processing apparatus capable of communication with a printing apparatus, comprising: a first acquisition step of obtaining first identification information indicating a log-in user upon generation and transmission of a printing job; a reception step of receiving notification information indicating a processing state of the printing job from an external apparatus; a second acquisition step of, when the notification information is received at the reception step, obtaining second identification information indicating a log-in user at the time of reception; and a determination step of determining whether or not the notification information is to be notified by comparing the first identification information obtained at the first acquisition step with the second identification information obtained at the second acquisition step.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<First Embodiment>

Figure 1:
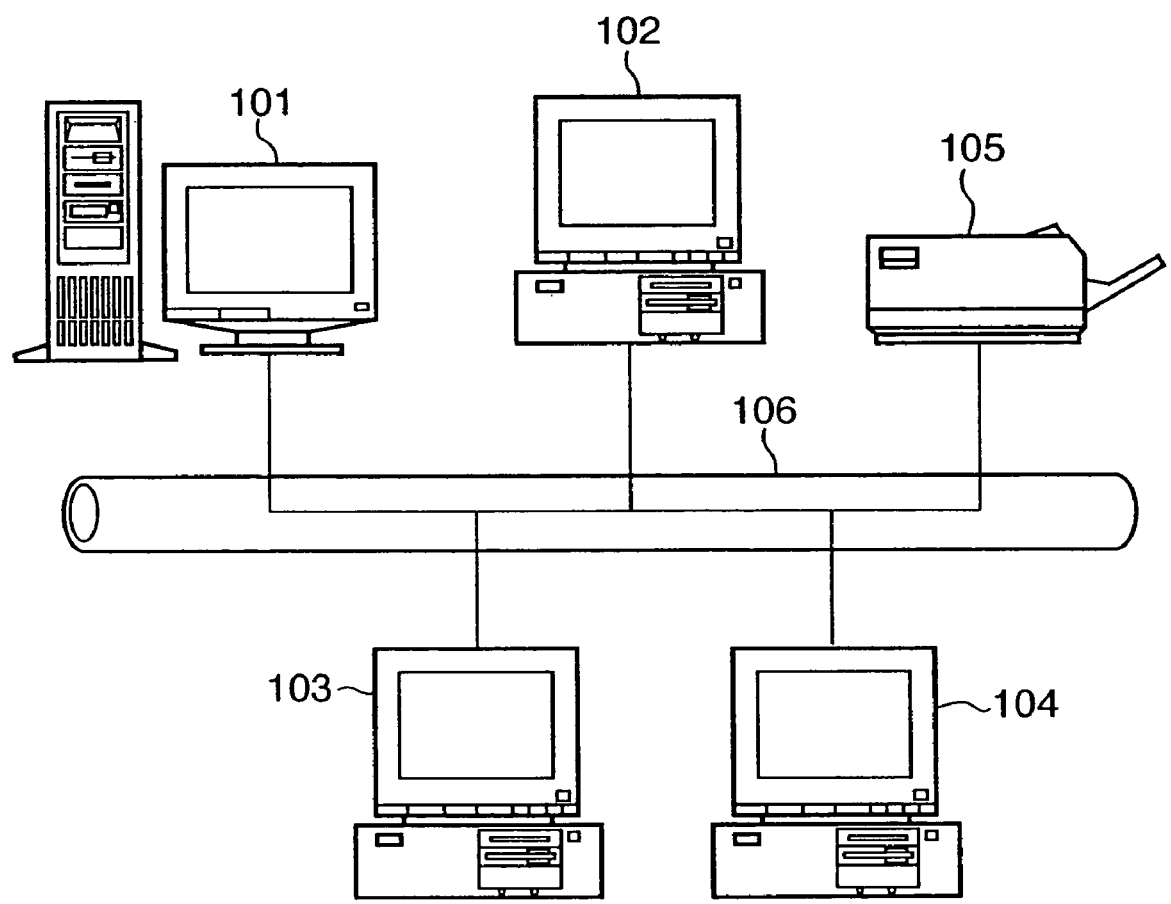
FIG. 1 is a block diagram showing the configuration of a print system according to a first embodiment of the present invention.

FIG. 1 is a block diagram showing the configuration of an information processing system according to a first embodiment. In FIG. 1, reference numerals 102, 103 and 104 denote information processing apparatuses which function as clients in a client-server system. Each client is connected to a network 106 via a network cable such as Ethernet (registered trademark), and is capable of execution of various programs such as application programs.

Note that the client in the present system is a personal computer. One or plural clients are connected to the network 106. Further, each client is also referred to as a "client PC". Further, the network 106 includes an Ethernet (registered trademark) cable or the like, however, the network cable is not limited to the Ethernet cable but a communication cable in conformity with e.g. an RS232C interface or radio communication may be utilized.

Further, the client PC includes a printer driver (print data generation unit) having a function of converting print data to printer language corresponding to the printer. Note that the printer driver supports plural printers.

Numeral 101 denotes an information processing apparatus which functions as a server in the client-server system. Further, the information processing apparatus 101 is connected to the network 106 via the network cable, and the apparatus stores files used on the clients on the network 106 or monitors the status of use of the network 106. Note that the information processing apparatus 101 also functions as a print server which manages plural printers connected to the network 106. In the present embodiment, the information processing apparatus 101 will be referred to as a print server 101.

In the present embodiment, the client PCs 102 to 104 and the print server 101, which are general information processing apparatuses, respectively hold print control programs for different controls in executable states. Further, the print server 101 may simultaneously have the functions of the client PCs 102 to 104.

The print server 101 of the present embodiment further has a function of storing printing jobs including print data, transmitted with print requests from the respective client PCs 102 to 104, and causing the network printer 105 to perform printing, a function of receiving only job information without print data from the client PCs 102 to 104, managing the printing order regarding the client PCs 102 to 104, and notifying permission to a client PC in turn to transmit a printing job including print data, and a function of obtaining the status of a network printer to be described later, various information of printing job and the like and notifying them to the client PCs 102 to 104.

Numeral 105 denotes a printing apparatus. In the present embodiment, a network printer is employed as the printing apparatus 105. The network printer 105, connected to the network 106 via a network interface (not shown), interprets a printing job including print data transmitted from a client PC, converts the job to a dot image by page, and performs printing by page. The network 106 interconnects the print server 101, the client PCs 102 to 104, the network printer 105 and the like.

Note that as the network printer 105, various types of printers such as an electrophotographic printer and an ink-jet printer can be employed. Note that the reception of print data and printing based on the received print data are realized by using well-known techniques, and the detailed explanations thereof will be omitted. Further, it is apparent that the group printing of the present embodiment is realized not only by the network printer but also between a host PC and a local printer.

Figure 2:
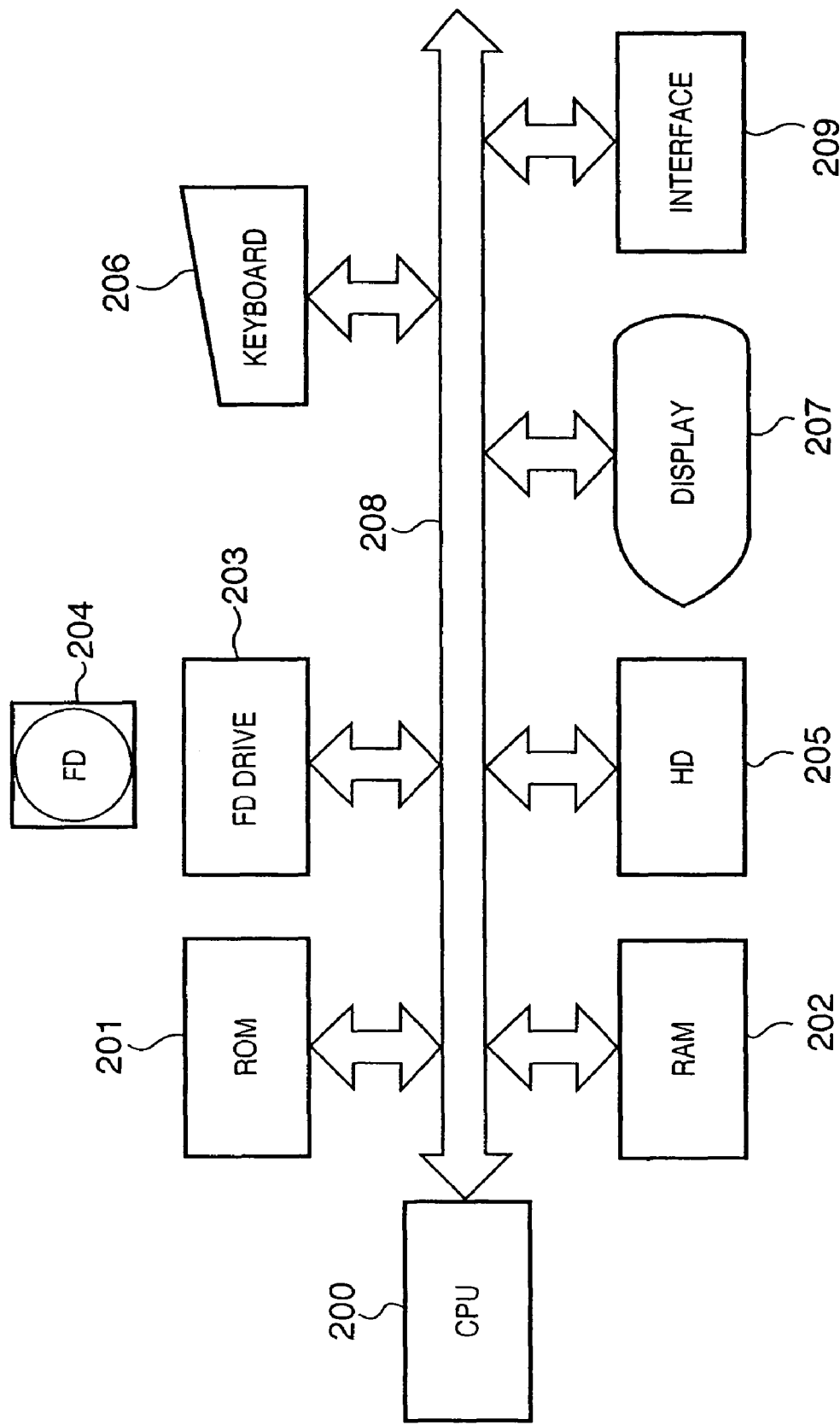
FIG. 2 is a block diagram showing the construction of a server or a client in FIG. 1.

FIG. 2 is a block diagram showing the construction of the information processing apparatus according to the present embodiment. The above-described print server 101 and the client PCs 102 to 104 as information processing apparatuses have a similar or equivalent hardware construction.

In FIG. 2, numeral 200 denotes a CPU which executes an application program, a printer driver program, an operating system (OS), a network printer control program and the like stored in a hard disk (HD) to be described later, and temporarily stores information, files and the like necessary for execution of program into a RAM 202.

Numeral 201 denotes a ROM in which programs such as a basic I/O program and various data such as font data used upon document processing and template data are stored. The RAM 202, which is used for temporarily storing various data, functions as a main memory for the CPU 200 and a work area or the like.

Numeral 203 denotes a drive unit to realize access to a recording medium. In the present embodiment, a flexible disk (FD) drive is used. A program or the like, recorded on a FD 204 as a recording medium can be loaded through the FD drive 203, into the present computer system. Note that the recording medium is not limited to the FD, but any medium such as a CD-ROM, a CD-R, a CD-RW, a PC card, a DVD, an IC memory card, an MO, or a memory stick can be arbitrarily used.

The flexible disk (FD) 204 is a recording medium holding a computer-readable program. Numeral 205 denotes an external storage device. In the present embodiment, a hard disk (HD) which functions as a large capacity memory is used as the external storage device 205. The hard disk 205 holds the application programs, the printer driver program, the OS, the network printer control program and associated programs and the like.

Note that a spooler to spool printing jobs is ensured in the hard disk 205. Among the client PCs, the spooler is a client spooler; and in the print server 101, the spooler is a server spooler. In the print server 101, various tables for storing job information received from the respective client PCs and for sequence control are stored in the external storage device (hard disk 205).

Numeral 206 denotes a keyboard as an instruction input device which is used by a user to input commands for the client PC, or used by an operator or an administrator to input device control command and the like for the print server 101.

Numeral 207 denotes a display which displays commands inputted from the keyboard 206, the printer statuses and the like.

Numeral 208 denotes a system bus for data flow among the information processing apparatuses as the client PCs and the print server. Numeral 209 denotes an interface through which data transmission/reception is performed with an external apparatus. In the present embodiment, the interface 209 realizes connection with the network 106.

In the present embodiment, the network printer control program and associated data are directly loaded from the FD 204 into the RAM 202 and executed, however, the loading of program is not limited to this arrangement. For example, it may be arranged such that the network printer control program, which is already installed in the HD 205, is loaded into the RAM 202 upon each actuation of the network printer control program.

Further, the medium holding the network printer control program is not limited to the FD but may be a CD-ROM, a CD-R, a PC card, a DVD, an IC memory or the like. Further, it may be arranged such that the network printer control program is stored in the ROM 201, thereby the network printer control program is stored in a part of memory map, and is directly executed by the CPU 200.

Further, software to realize functions equivalent to those of the above devices may substitute for the hardware devices.

Further, the network printer control program will also be simply referred to as a "print control program". The print control program includes a program to direct changing of print destination of a printing job or changing of print order in a client PC, and a program to perform printing-job sequence control or to notify printing-job completion, a print destination change request and the like, in the print server 101.

Further, the print control program to perform the above controls may be provided as a module installed in a client PC and a module installed in the print server 101. Otherwise, it may be arranged such that one print control program functions as a client PC program or as a print server program in accordance with environment where it is executed. Otherwise, it may be arranged such that a module having a function for a client PC and a module having a function for a print server are installed together in one computer, and they are actuated simultaneously or time-divisionally as pseudo-parallel operations.

Further, the control program may be realized by co-operation of a module installed in a client and a module installed in a print server. Otherwise, the control program may be realized by a single module installed in a client or a print server.

Figure 3:
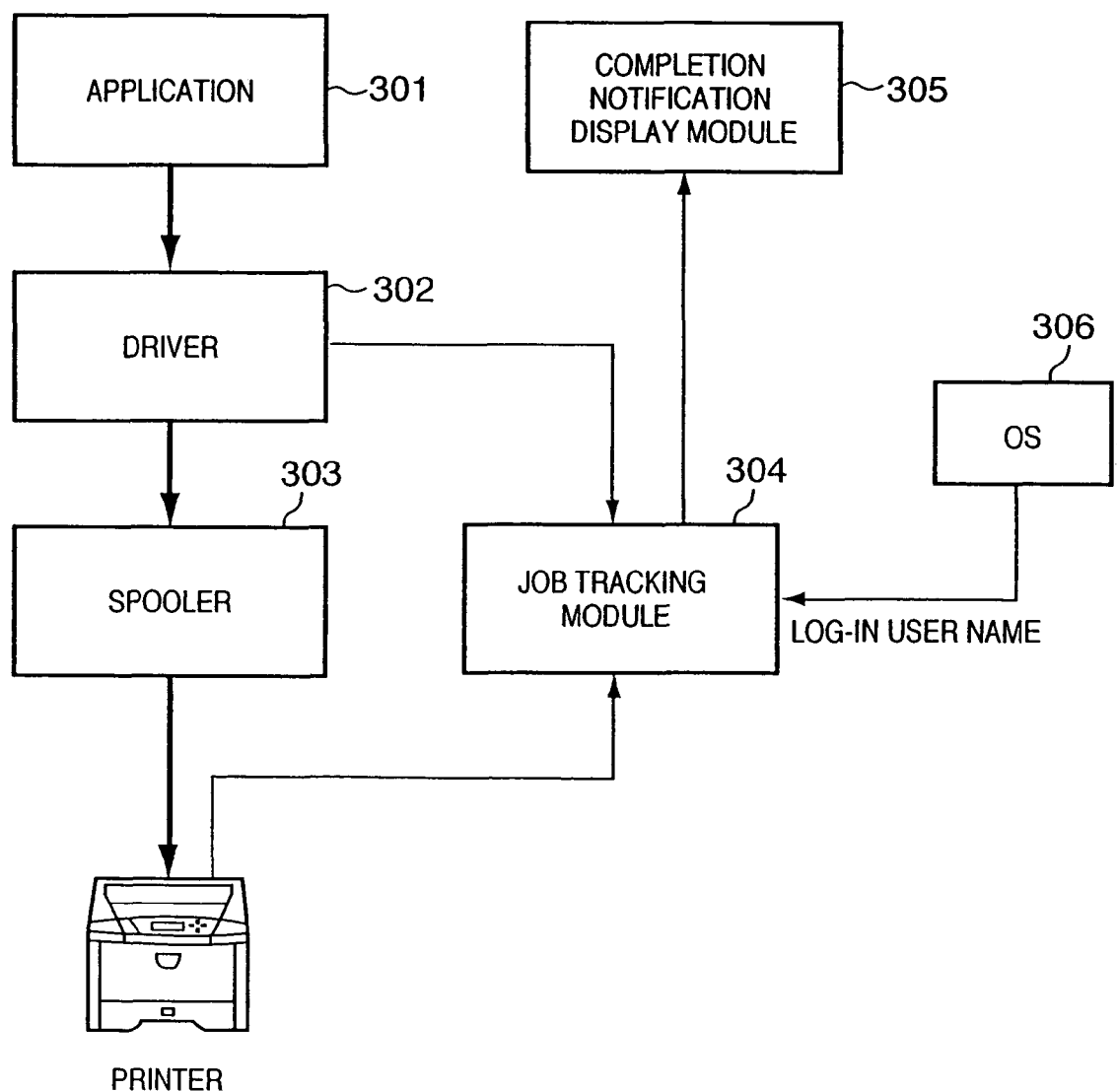
FIG. 3 is a block diagram showing the functional construction of the print system according to the first embodiment.
Figure 5:
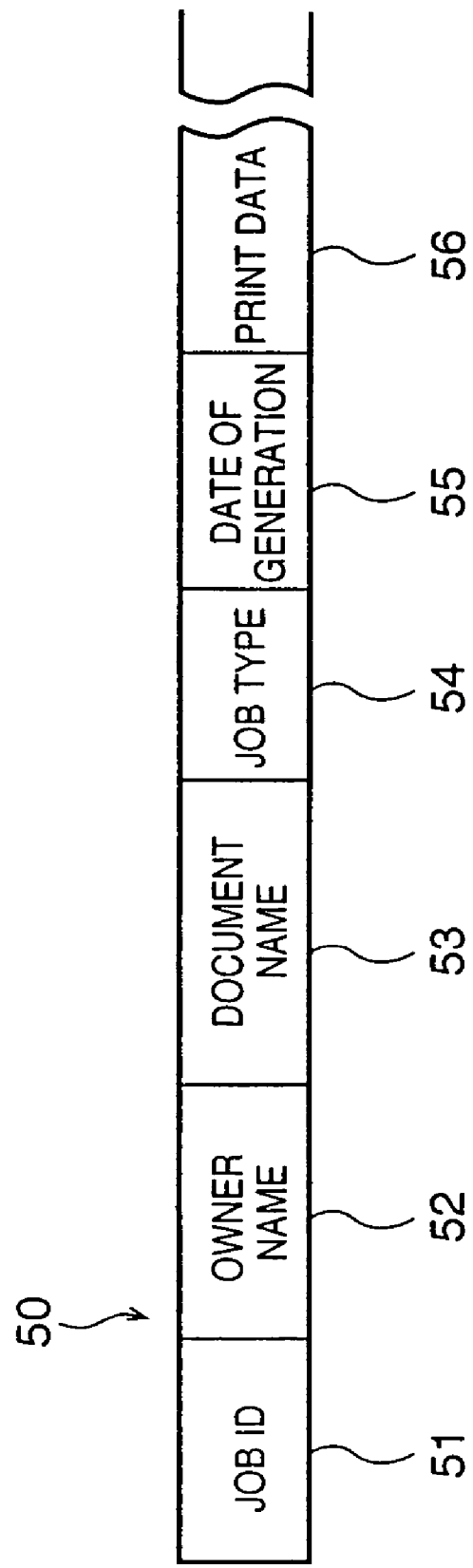
FIG. 5 is an example of data structure of a printing job.

FIG. 3 is a block diagram showing the functional construction of the print system according to the first embodiment. The respective functions are realized by execution of control program by the CPU 200. The user requests printing of document or the like using an application 301 (for example, Microsoft Word (registered trademark)). The application 301 causes generation of a series of drawing commands via a graphic function of the OS (Operating System), to generate print data which can be interpreted by the printer using a driver 302. At this time, the driver 302 adds various attachment information (job attachment information) such as a job ID to the print data thereby generating a printing job. FIG. 5 shows an example of data structure of printing job. As the job attachment information, a job ID 51, an owner name 52 (driver-generated user name), a document name 53, a job type 54, and a generation date 55 are added. Note that in the present specification, the name of a person who generated the printing job is referred to as an owner name, and the name of a user who logs in the system is referred to as a log-in user name. However, these names may be data obtained from the same reference source.

Note that the log-in user name and the owner name forwarded from the driver to a job tracking module 304 are obtained based on information accompanying a drawing command inputted from the application to the driver 302 via the OS.

The driver 302 transfers the generated printing job to a spooler 303, and forwards the attachment information of the printing job (for example, a job ID, an owner name (driver-generated user name) and document name) to the job tracking module 304. Note that in a case where a printing job is deformed by security processing such as encryption upon secure printing, the printing job transferred to the spooler 303 and the job attachment information transferred to the job tracking module 304 have been subjected to the security processing.

Figure 4:
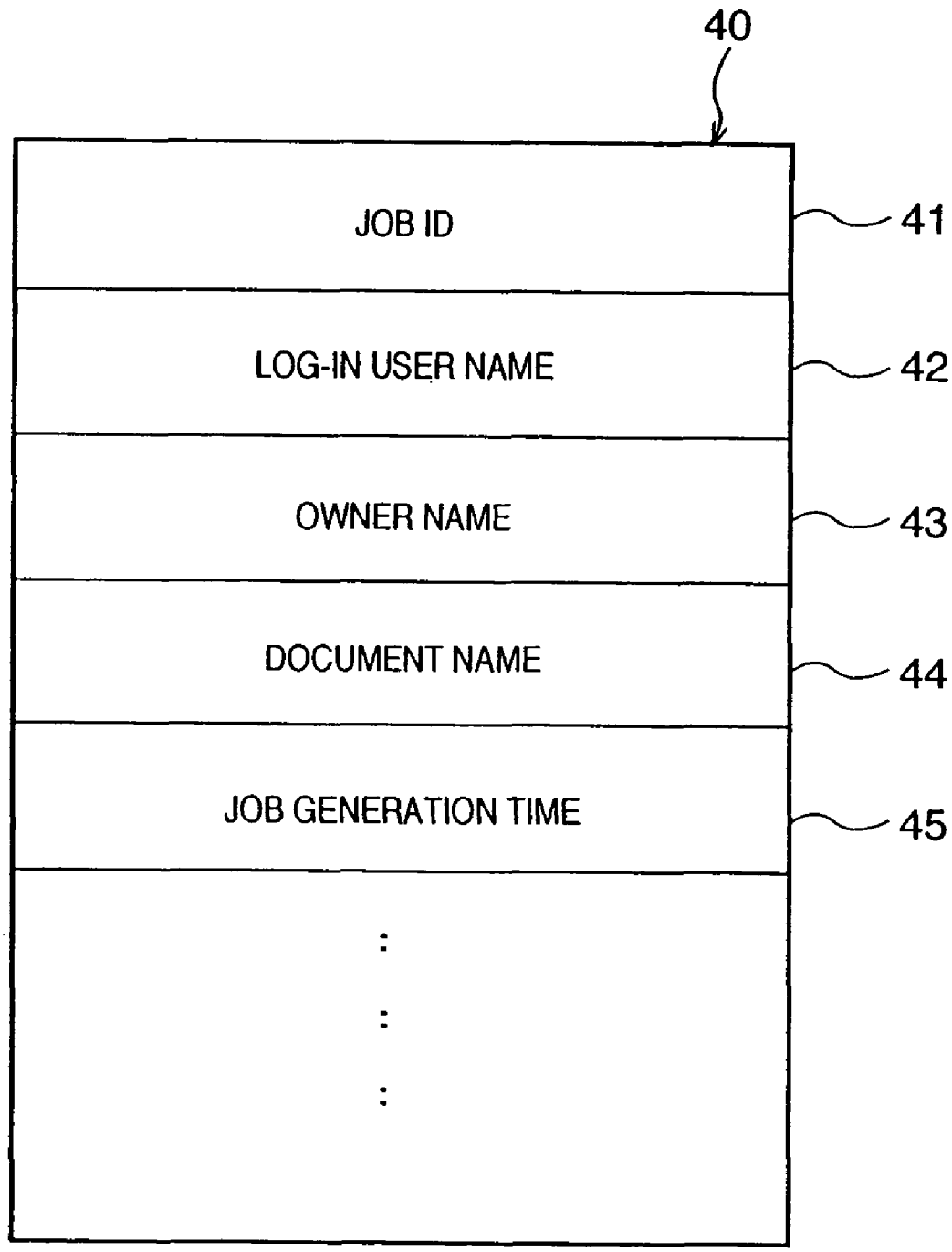
FIG. 4 is a table showing the data structure of job attachment information stored by a job tracking module by job.

The job tracking module 304 obtains a log-in user name using a predetermined API (Application Program Interface) from an OS 306 at timing of reception of the job attachment information, generates job tracking information in the format as shown in FIG. 4 based on the job attachment information forwarded from the driver 302, and appropriately stores the information in a storage area such as the RAM 202.

The acquisition of log-in user name from the OS may be made by, e.g., in Windows (registered trademark) XP, obtaining current user information by utilizing Win32API of the Terminal Service (MetaFrame) in FastUserSwitching as a part of the functions of Terminal Service of instant user switching. For example, first, a user who establishes the session is obtained by WTSEnumerateSessions( ) or WTSQueryUserToken( ), and the log-in user name and the session ID are obtained. Then the currently active session is obtained by WTSGetActiveConsoleSessionId( ). The combination of these two information, the log-in user (identification information) of the currently active session is obtained.

Further, in Windows (registered trademark) 2000 or XP, a current log-in user name can be obtained by a job tracking module by making an inquiry by NEtWkstaUserEnum( ) or NetWkstaUserGetInfor( ) in the system.

Note that in the present embodiment, the job tracking module 304 receives the job attachment information from the driver 302, however, it may be arranged such that the printing job is received from the driver 302 and the job attachment information is extracted by the job tracking module 304. Further, in a system where the job attachment information is encrypted, a construction to decrypt the encrypted information may be provided in the job tracking module 304. Further, in an arrangement where the driver 302 forwards the job attachment information to the job tracking module 304 and then the driver 302 performs security processing such as encryption on first identification information indicating the log-in user name included in the printing job, the processing to obtain the log-in user name from the OS by using the predetermined API can be omitted. Further, as in the case of the following other embodiments, the job tracking information does not necessarily include all the information as shown in FIG. 4. For example, in the first embodiment, the job tracking information includes the job ID and the log-in user name, but optionally includes the other information.

The spooler 303 forwards the printing job, received from the driver 302, to a printer selected by the user. In a predetermined status in execution of the printing job, e.g., upon completion of the printing job or when the printing job is seemingly completed, the printer 105 generates notification information and provides the information to the job tracking module 304 on the host side. The notification information includes a job ID of the printing job, job information, an owner name (driver-generated user name), a file name, job type, print execution time and the like. Note that in the present embodiment, the notification information is used for notification of completion of printing job. Such notification information will be referred to as result notification information.

Figure 8:
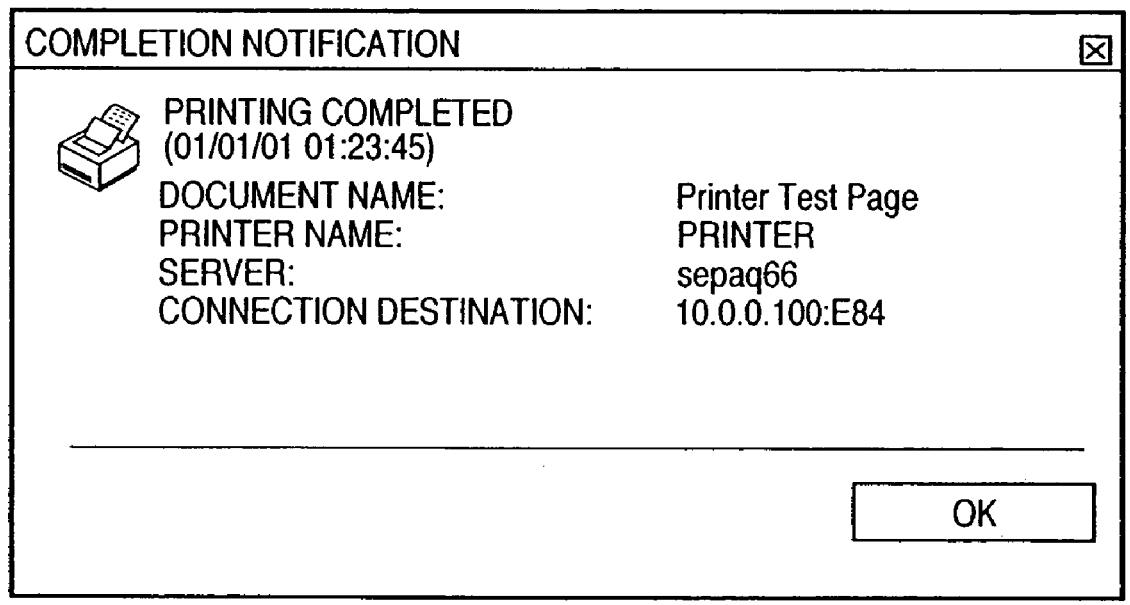
FIG. 8 is an example of notification of successful printing.

The job tracking module 304 compares job tracking information 40 stored in a storage area such as the RAM 202 with the job attachment information included in the result notification information obtained from the printer 105, and determines whether or not the result notification information is to be displayed. If it is determined that the result notification information is to be displayed, a completion notification display module 305 displays the result notification as shown in FIG. 8. Note that the application 301, the driver 302, the spooler 303, the job tracking module 304 and the completion notification display module 305 may be provided in the same information processing apparatus, or may be distributed in plural information processing apparatuses. In the present embodiment, for the sake of simplicity of explanation, the above functional modules (301 to 305) are provided in one information processing apparatus.

FIG. 4 shows an example of the job tracking information 40, generated by the job tracking module 304 based on the job attachment information notified from the driver 302 and the log-in user name obtained from the OS 306, and stored in the storage area such as the RAM 202. In this example, the job tracking information 40 includes the job attachment information (job ID 41, an owner name 43 (driver-generated user name), document name 44 and the like) provided from the driver 302, job generation time 45, and a current log-in user name 42 in the OS 306. The current log-in user name 42 is obtained from the OS 306, in addition to the owner name (driver-generated user name) included in the attachment information received from the driver 302, and stored by 1 job. The job ID 41 is information to uniquely determine the job in the print system. For example, the job ID 41 is a combination of a host name and a numeral having a sufficiently wide range added by job.

Figure 6:
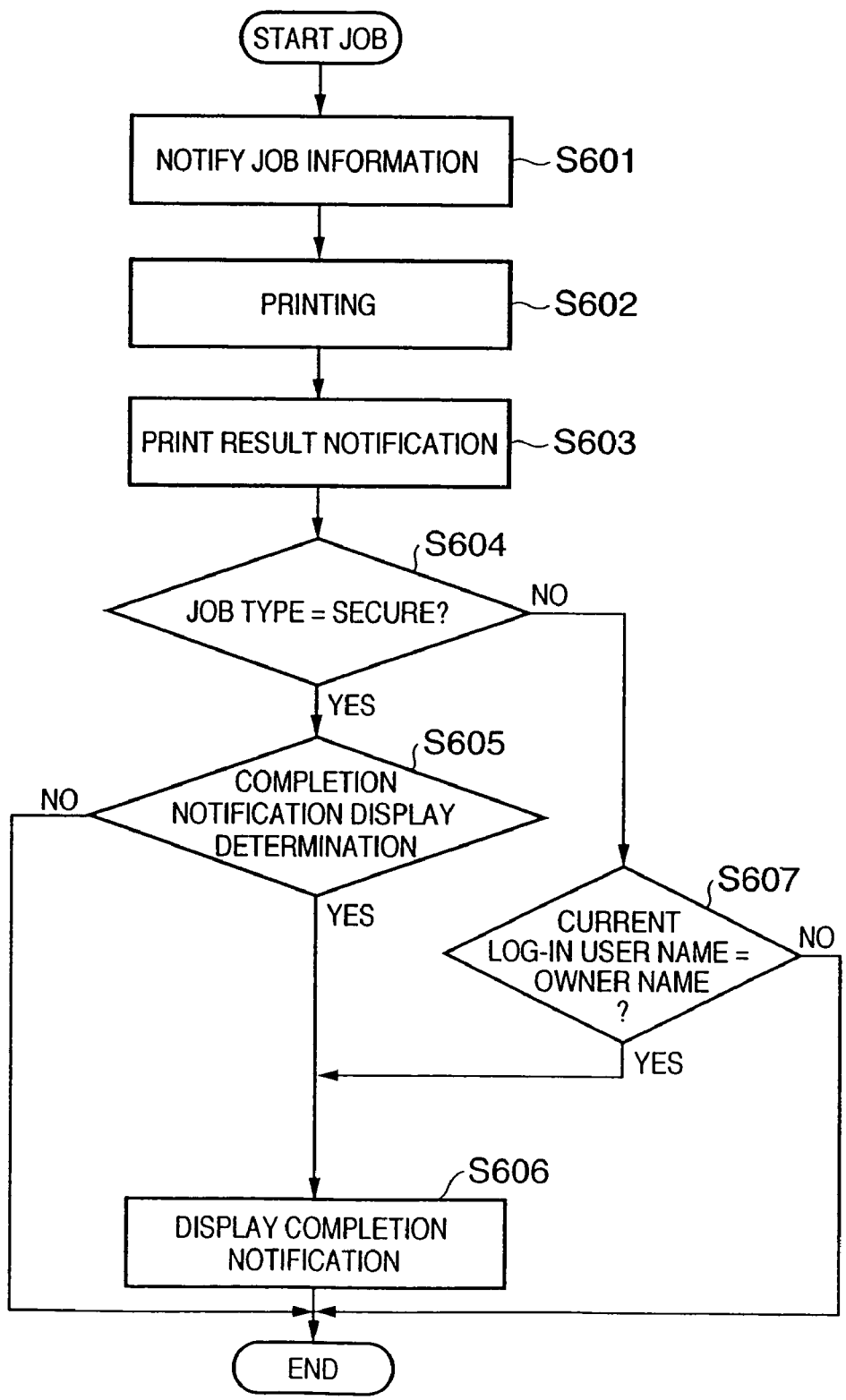
FIG. 6 is a flowchart showing printing-job completion notification processing according to the first embodiment.

Hereinbelow, printing-job completion notification processing according to the present embodiment will be described with reference to the flowchart of FIG. 6. Note that in the present embodiment, the notification of completion of printing job is described, however, it is apparent to those skilled in the art that similar processing is applicable to notification of other printing-job processing statuses.

When printing is requested in the application 301, the driver 302 notifies the start of printing job by a predetermined method to the job tracking module 304 (step S601). At that time, a job ID, an owner name, a document name, date of generation and the like are forwarded as the job attachment information. The job tracking module 304 generates the tracking information 40 as shown in FIG. 4 using the received job attachment information and a log-in user name or the like obtained from the OS 306 or the driver 302, in job units, and stores the tracking information 40 in the RAM 202 by job. Note that when the owner name is generated by using a log-in user name, the owner name and the log-in user name have the same identification information.

When the printing job has been spooled in the spooler 303, the printing job is transmitted via the interface 209 to the printer 105 (step S602). The transmitted printing job is print-outputted by the printer 105. When the printing has been completed, the printer 105 generates result notification information. As described above, the result notification information includes the print result and the attachment information (e.g., the job ID, the owner name, the job type, the date of generation, print execution time and the like included in the job attachment information).

When the result notification information from the printer 105 has been received via the interface 209 (step S603), the job tracking module 304 determines whether or not the type of the printing job is secure job (the owner name 43 and the document name 44 are rewritten) based on the attachment information (job type) included in the result notification information (step S604). Note that it may be arranged such that corresponding job tracking information 40 is retrieved based on the job ID of the result notification information and it is determined that the job is a secure job if the log-in user name 42 does not correspond with the owner name 43. In this case, however, as the corresponding job tracking information exists upon determination of secure job, the processing at step S701 in FIG. 7 to be described later (determination as to whether or not corresponding job exists) is unnecessary.

Figure 7:
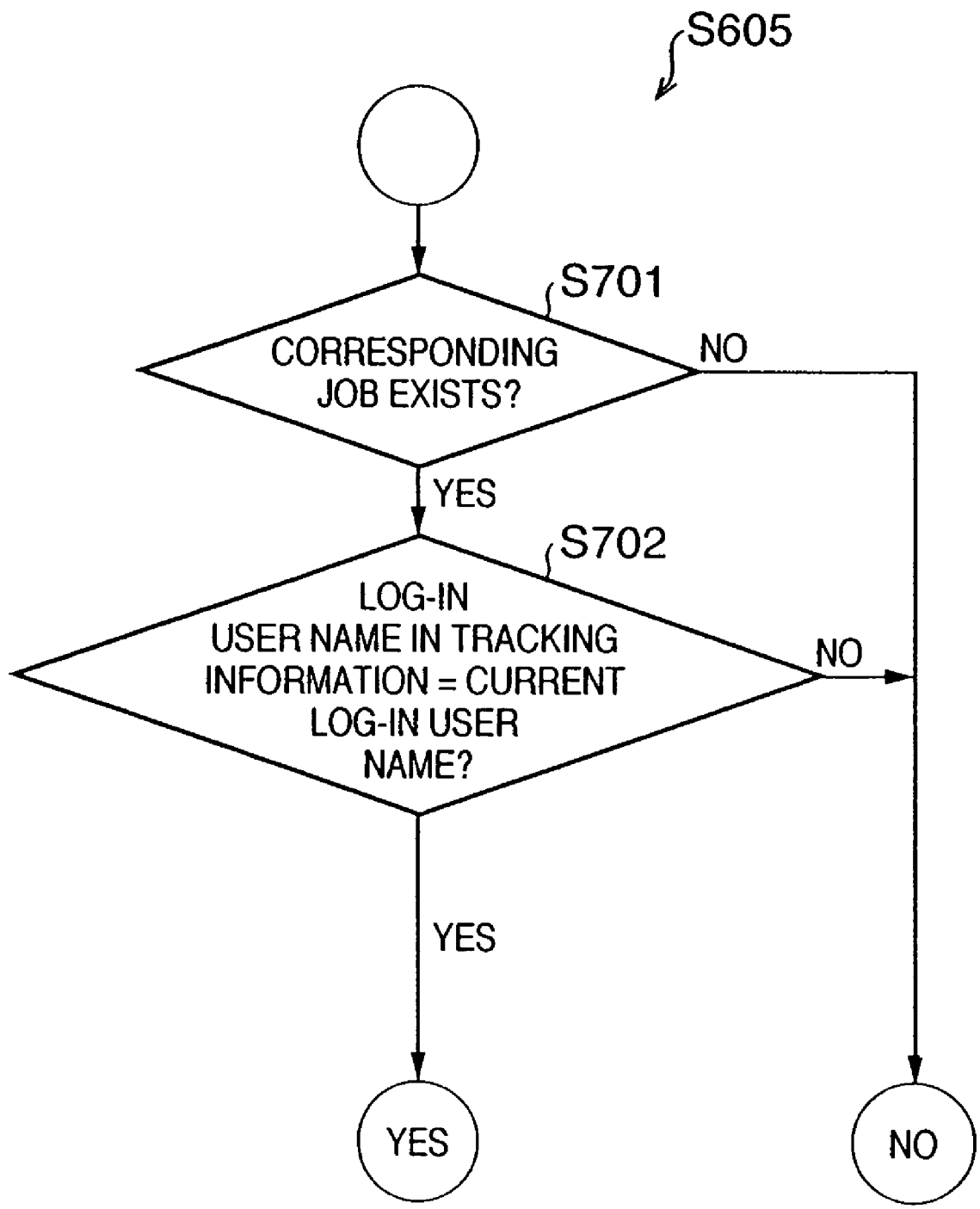
FIG. 7 is a flowchart showing completion notification determination processing according to the first embodiment.

If it is determined at step S604 that the job is a secure job, it is determined whether or not the completion notification is to be displayed by the method shown in FIG. 7 (step S605). At sep S605, if it is determined that the completion notification is to be displayed, a result notification as shown in FIG. 8 is generated and displayed on the display 207 (step S606).

On the other hand, if it is determined at step S604 that the job type of the printing job is not secure job, i.e., the printing job is a normal job, the owner name 43 is obtained from the job tracking information corresponding to the printing job stored in the RAM 202 or the like, and the current log-in user name is obtained from the OS 306, and the names are compared with each other. If the owner name and the current log-in user name correspond with each other, the completion notification as shown in FIG. 8 is displayed on the display 207 (step S606). Note that in the case of normal job, as the correspondence between the owner name notified from the printer at step S603 and the value set in the owner name 43 in the job tracking information is assured, the owner name notified from the printer may be used in the comparison at step S607.

Next, the above-described completion notification display determination processing at step S605 will be described with reference to the flowchart of FIG. 7.

The job tracking module 304 retrieves corresponding job tracking information from the job tracking information stored in the RAM 202, by using the job ID in the result notification information including the attachment information received at step S603, as a key (step S701). If corresponding job tracking information exists, the log-in user name is obtained from the job tracking information, and the current log-in user name is obtained from the OS 306, and the log-in user names are compared with each other (step S702). If these names correspond with each other, i.e., if YES at step S702, as it is determined as YES at step S605, the process proceeds to step S606, to display the completion notification as shown in FIG. 8 on the display 207. On the other hand, if the log-in user name obtained from the job tracking information and the current log-in user name obtained from the OS 306 do not correspond with each other, i.e., NO at step S702, as it is determined as NO at step S605, the completion notification of the printing job is not displayed.

By the processing at step S702, it is determined whether or not the completion notification is to be displayed, by using the log-in user name 42, obtained upon job generation and stored in the tracking information 40 by the job tracking module 304, without using the owner name (driver-generated user name) included in the job attachment information (FIG. 5) of the printing job forwarded from the driver 302 and held as the owner name 43 in the tracking information 40. According to the first embodiment, it can be appropriately determined whether or not the current log-in user name corresponds with a user to whom a message is to be presented. That is, the job tracking module 304 holds at least the job ID of a printing job and a log-in user name upon generation of the printing job, as linked with each other. When result notification information is received, the log-in user name upon generation of the printing job is obtained by retrieval with the job ID included in the result notification information. The obtained log-in user name is compared with a current log-in user name. then it is determined based on the result of comparison whether or not the result notification information is to be displayed.

This arrangement is applicable to a case where job attachment information of a printing job forwarded from the driver 302 is encrypted and an owner name is indecipherable. Further, in a case where a current log-in user name provided to a host can be obtained by plural methods and the driver and the job tracking module use different methods, inconvenience that it is erroneously determined in the completion notification display determination processing that "the notification is not to be displayed" when the obtained log-in user names are different even in the same user environment can be solved. That is, since the log-in user name registered in the job tracking information and the current log-in user name obtained at step S702 are obtained by the same job tracking module, even in an environment where plural types of log-in user acquisition methods exist, the log-in user names can be obtained without the influence of the environment.

<Second Embodiment>

In the above-described first embodiment, the display of completion notification is disabled if a log-in user name recorded in the tracking information and a current log-in user name do not correspond with each other. On the other hand, in Windows (registered trademark) XP, on the assumption that one personal computer is shared among plural users, a function "multi log-in" is provided. In an previously-activated displayed screen image, registered user names are displayed, and one name is clicked and a password is inputted, thereby a disk-top image specialized for the user is displayed. Further, an operation environment (multi user) enabling user switching while maintaining a status where plural users simultaneously log in is also provided. In this operation environment, the log-in user may frequently change. Accordingly, in the second embodiment, when a log-in user has changed and the display of completion notification is disabled, the result notification information is stored, and upon log-in with the corresponding user name again, the print result notification is enabled.

The print system of the second embodiment has the same construction as that of the first embodiment except the following operations in the result notification display processing. First, in the second embodiment, at step S605 in FIG. 6, if the log-in user names do not correspond with each other, the result notification information is stored by owner (log-in user name). Then log-in user switching in the OS 306 is monitored. Upon occurrence of log-in user switching, a search is performed through the stored result notification information, and if result notification information with corresponding log-in user name exists, the completion notification is displayed. Hereinbelow, the processing according to the second embodiment will be described with reference to the flowcharts of FIGS. 9 and 10.

Figure 9:
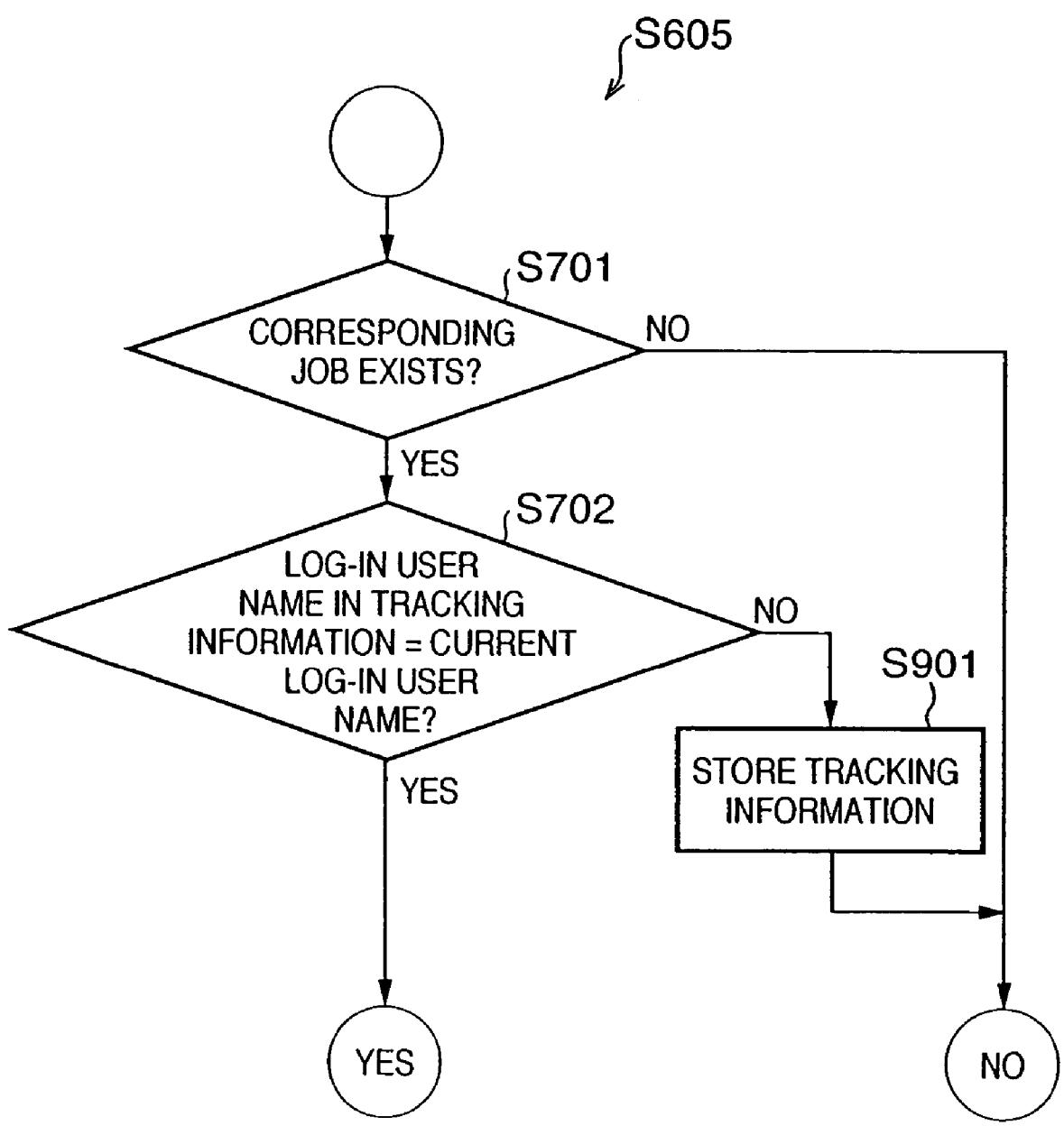
FIG. 9 is a flowchart showing the completion notification determination processing according to a second embodiment of the present invention.

FIG. 9 is a flowchart showing the processing at step S605 according to the second embodiment. In place of the processing shown in FIG. 7 in the first embodiment, the processing shown in FIG. 9 is performed. The processings at steps S701 and S702 are the same as those described in the first embodiment. That is, by using the job ID in the print result including the attachment information received at step S603 as a key, corresponding job tracking information is retrieved from the job tracking information stored in the RAM 202 (step S701). If corresponding job tracking information exists, the log-in user name is obtained from the job tracking information, and the current log-in user name is obtained from the OS 306, and the log-in user names are compared with each other (step S702). If the log-in user names correspond with each other, it is determined at step S605 as YES, then the completion notification as shown in FIG. 8 is displayed on the display 207 at step S606.

If the log-in user name in the job tracking information and the current log-in user name obtained from the OS 306 do not correspond with each other, the process proceeds from step S702 to step S901, at which the result notification information and the corresponding tracking information are stored in a predetermined area of the RAM 202. In this case, it is determined at step S605 as NO, and the result notification information is not displayed.

The job tracking module 304 always monitors the log-in user name. When the log-in user name has been changed, if notification information to be presented for the new log-in user name exists, the job tracking module 304 displays the information. This processing will be described with reference to the flowchart of FIG. 10.

The job tracking module 304 obtains a log-in user name from the OS 306, and stores it in a log-in user name storage area ensured in the RAM 202 (step S1001). The job tracking module 304 obtains a log-in user name every predetermined time, and compares it with the log-in user name stored at step S1001 (step S1002). As a result of comparison, if the log-in user names are different, the current log-in user name is stored in the log-in user name storage area of the RAM 202, thereby the log-in user name is updated (step S1003). Next, a search is performed through the tracking information stored in the RAM 202 at step S901 with the new log-in user name, and it is determined whether or not tracking information having corresponding log-in user name exists (step S1004).

Figure 10:
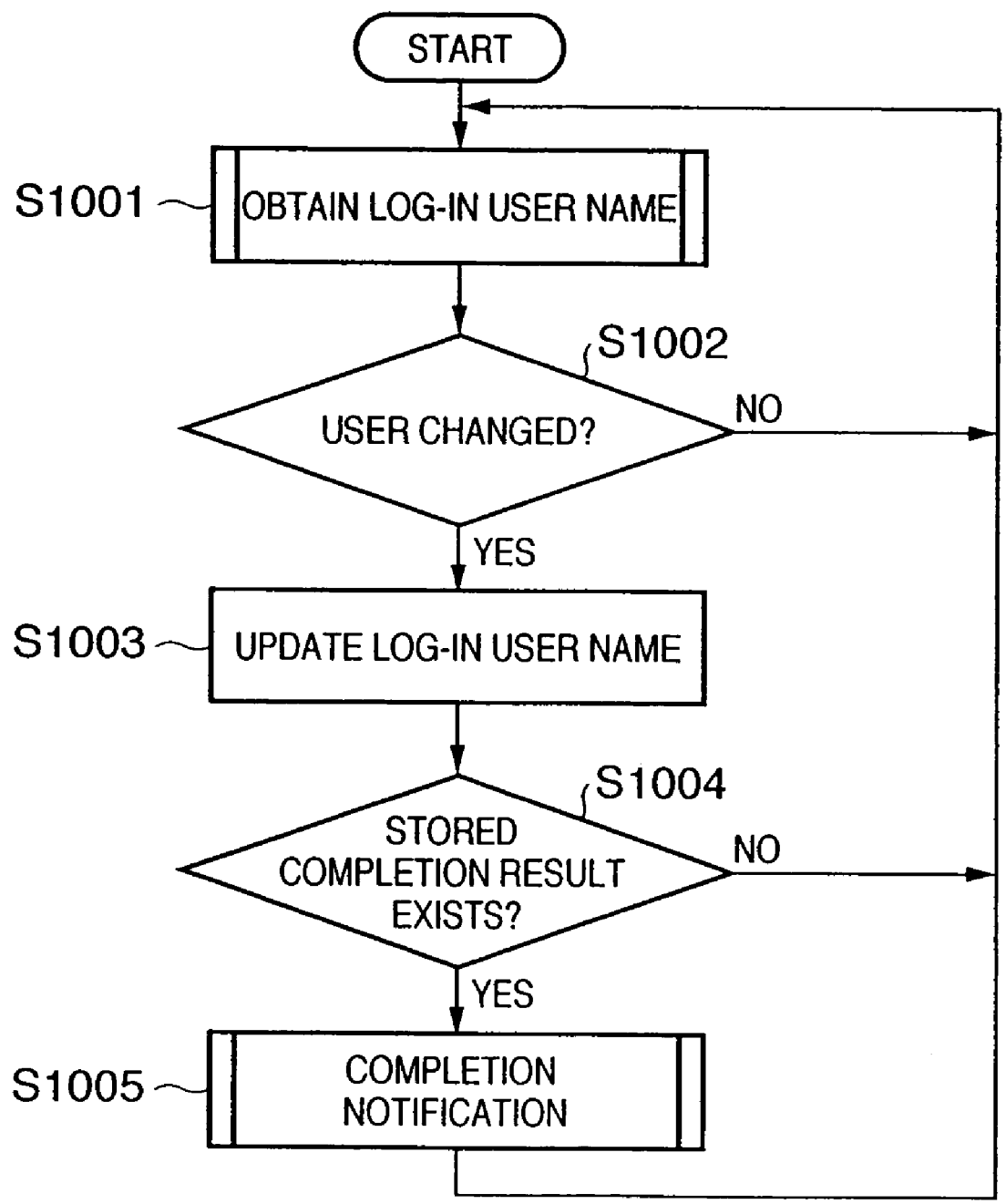
FIG. 10 is a flowchart showing log-in user name update processing according to the second embodiment.

At step S1004, if it is determined that corresponding tracking information exists, the process proceeds to step S1005, at which corresponding result notification information is obtained, and completion notification is performed (step S1005). Note that the processing at steps S1001 to S1005 in FIG. 10 is performed in the job tracking module in parallel with the completion notification display processing shown in FIGS. 6 and 9.

As described above, according to the second embodiment, as the job tracking information (especially job ID and log-in user name) and result notification information are linked with each other and stored, even when log-in user names are different upon reception of result notification information, the result notification information can be displayed when the log-in user changes to a corresponding log-in user. Accordingly, even if the user frequently changes, the completion notification or the like can be appropriately display without omission.

Note that in the second embodiment, the result notification information is stored if a printing job is a secure job, however, the arrangement in the second embodiment can be applied to a normal printing job without designation of secure job or the like. In this case, if it is determined as NO at step S607, the result notification information and the job tracking information are stored, then subjected to search at step S1004.

<Third Embodiment>

In the first embodiment, it is determined whether or not the result notification information is to be displayed by retrieving corresponding tracking information from result notification information and comparing a log-in user name included in the tracking information with a current log-in user name. In this arrangement, as shown in the second embodiment, the change of log-in user name is monitored, and the result notification information can be displayed later when the log-in user names correspond with each other.

In the third embodiment, the result notification is made to an appropriate log-in user without registration of log-in user name in the tracking information.

Figure 11:
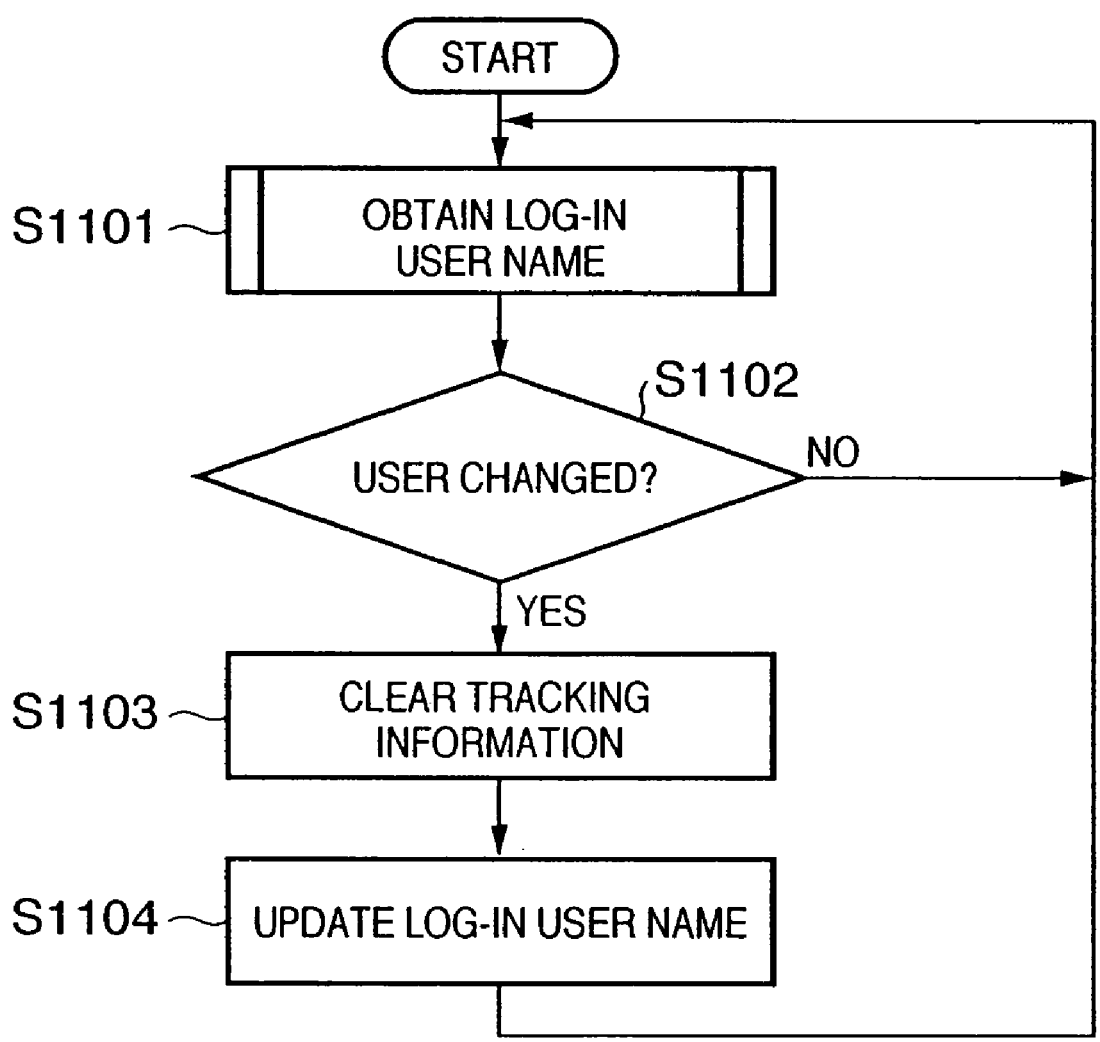
FIG. 11 is a flowchart showing tracking information deletion processing according to a third embodiment of the present invention.
Figure 12:
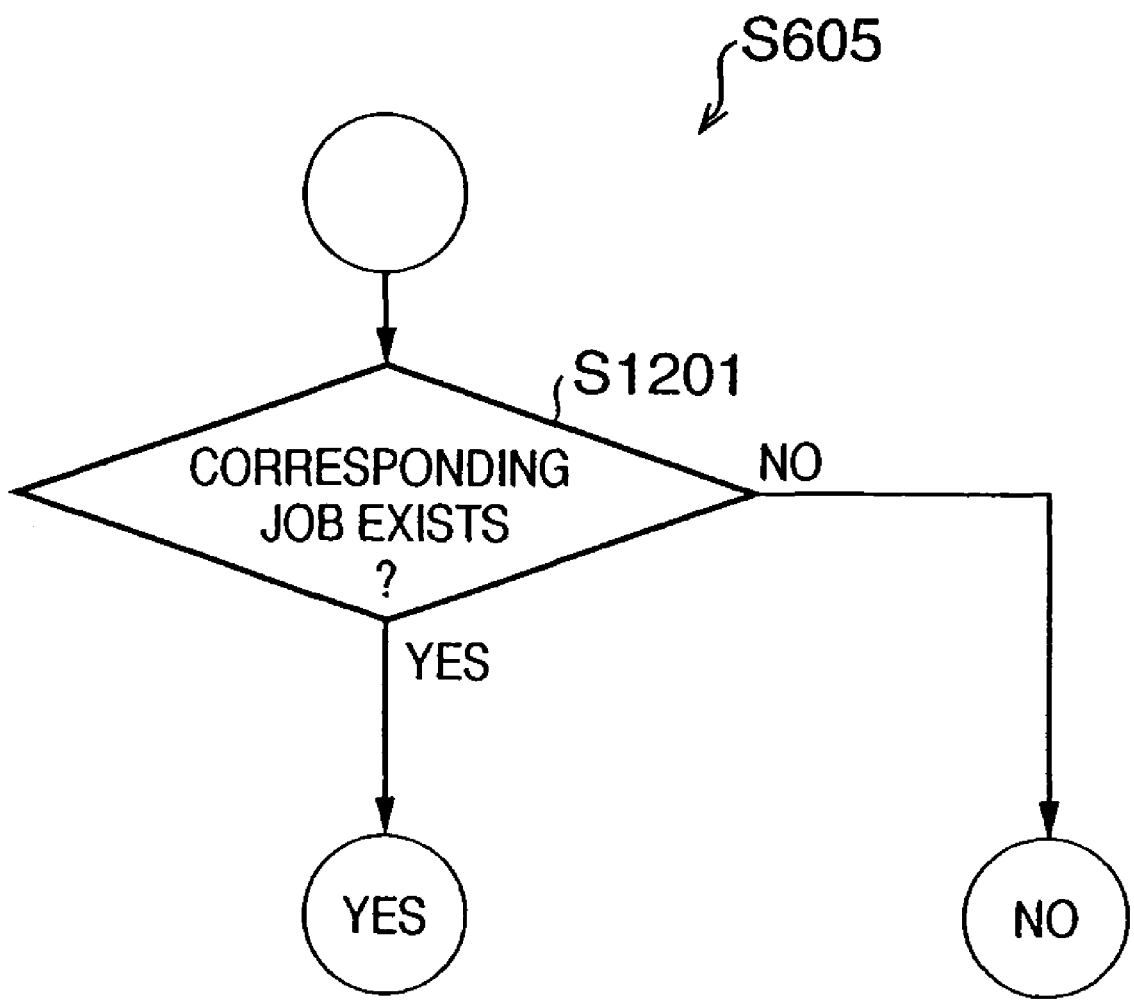
FIG. 12 is a flowchart showing the completion notification determination processing according to the third embodiment.

Next, the completion notification display determination processing at step S605 in FIG. 6 according to the third embodiment will be described with reference to FIGS. 11 and 12. The other processings than the completion notification display determination are the same as those in the first embodiment, therefore, the explanations thereof will be omitted. Note that the recording of log-in user name in tracking information is not necessary.

When the job tracking module 304 is activated, it obtains a log-in user name from the OS 306, and stores the log-in user name in the log-in user name storage area ensured in the RAM 202 (step S1101). Next, the job tracking module 304 obtains a log-in user name from the OS 306 every predetermined time, and compares the obtained log-in user name with the log-in user name stored at step S1101 (step S1102). As a result, if it is determined that the names are different, the job tracking information stored in the predetermined area of the RAM 202 is invalidated (step S1103). The invalidation is realized by, e.g., clearing the job ID to "0". Next, the current log-in user name is overwritten in the log-in user name storage area in the RAM 202, thereby the log-in user name is updated (step S1104). Note that the processing at steps S1101 to S1104 is performed in the job tracking module 304 in parallel with the completion notification display determination processing at step S605.

Next, the completion notification determination processing will be described with reference to FIG. 12. The job tracking module 304 retrieves a corresponding job from the job tracking information stored in the RAM 202 based on the attachment information of the notification information (step S1201). In a case where the log-in user has changed, the job information as the subject of tracking has been invalidated at step S1103, the corresponding job is not retrieved at step S1201. Accordingly, only when the log-in user has not changed, the completion notification is displayed through the completion notification determination processing.

As described above, according to the third embodiment, it is unnecessary to register a log-in user name in the tracking information. Further, as the tracking information is cleared when the user has changed, the memory capacity can be saved. Further, even in a case where the log-in user name cannot be obtained due to some restriction, the completion notification can be presented to an appropriate user.

<Fourth Embodiment>

As described above, in Windows (registered trademark) XP, on the assumption that one personal computer is shared among plural users, a function "multi log-in" is provided. In this multi log-in environment, the same name may be used as a host log-in user name. For example, all the users log in the host with a user name "Guest". In such case, even different users log in the host, as the log-in user names correspond with each other, the result notification may be performed to an inappropriate user in the result notification display processing according to the first embodiment.

Accordingly, in the following fourth to sixth embodiment, in such case, it is determined that the user has changed when the user has once logged off even the same user name is used, and the completion notification is not displayed. That is, only when the user who performed printing has not logged off, the completion notification is displayed.

Figure 13:
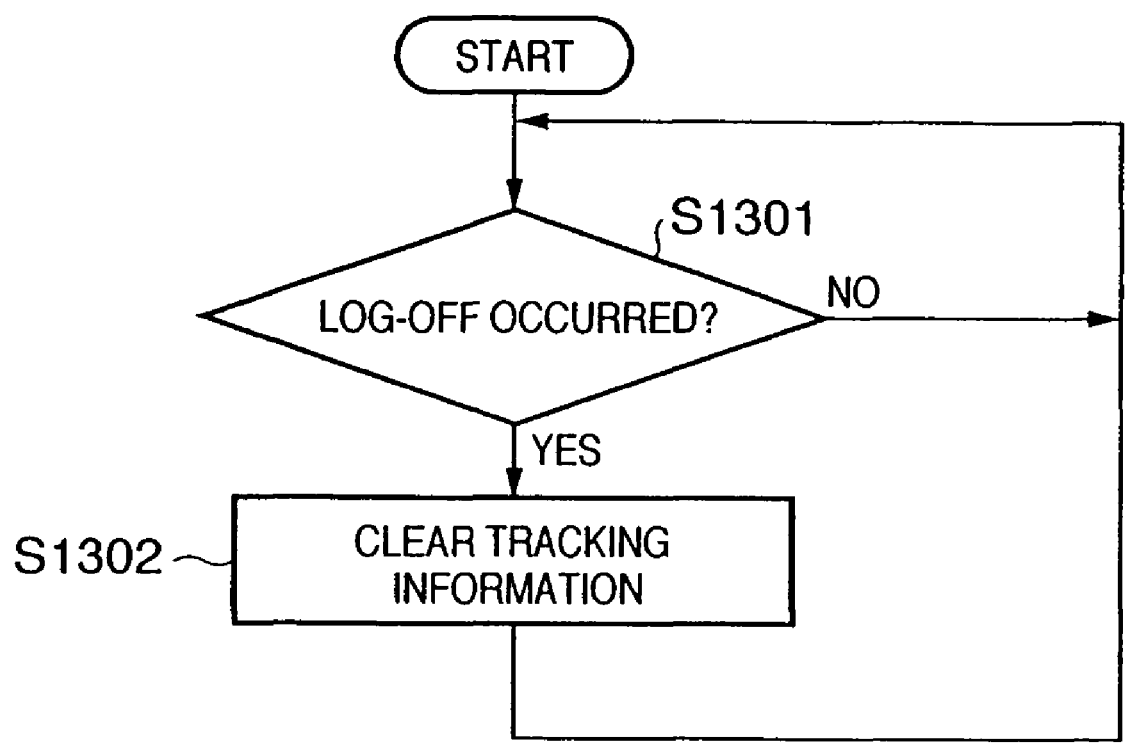
FIG. 13 is a flowchart showing the tracking information deletion processing according to a fourth embodiment of the present invention.

First, the completion notification display determination at step S605 in FIG. 6 according to the fourth embodiment will be described with reference to FIGS. 13 and 12. The other processings than the completion notification display determination are the same as those in the first embodiment, therefore, the explanations thereof will be omitted. Note that in the fourth embodiment, the recording of log-in user name in tracking information is not necessary.

When the job tracking module has been activated, it monitors whether or not log-off or log-in user switching has occurred (step S1301). When log-off or log-in user switching has been detected, the job tracking module invalidates the job tracking information stored in the RAM 212 (step S1302). For example, as the monitoring of occurrence of log-of, notification from the completion processing at the OS accompanying the log-off may be monitored. As the invalidation of job tracking information, for example, the job ID may be cleared to "0". Thereafter, the process returns to step S1301, to monitor the occurrence of log-off or log-in user switching.

The completion notification determination processing at step S605 is the same as that described above in FIG. 12. In a case log-off or log-in user switching has occurred between the transmission of printing job and the reception of the completion result information, the job information as the subject of tracking is invalidated at step S1302, corresponding job is not retrieved at step S1201. Accordingly, only when log-off or log-in user switching has not occurred, it is determined that the completion notification is to be displayed.

In a case where log-off or log-in user switching has occurred even once, it can be determined that there is a high probability that the user upon execution of printing and the current log-in user do not correspond with each other, and the job completion result is not displayed for the current log-in user who presumably has not executed the printing job. Accordingly, even if the same log-in user name such as "Guest" is used, the completion result display can be appropriately determined.

<Fifth Embodiment>

Figure 14:
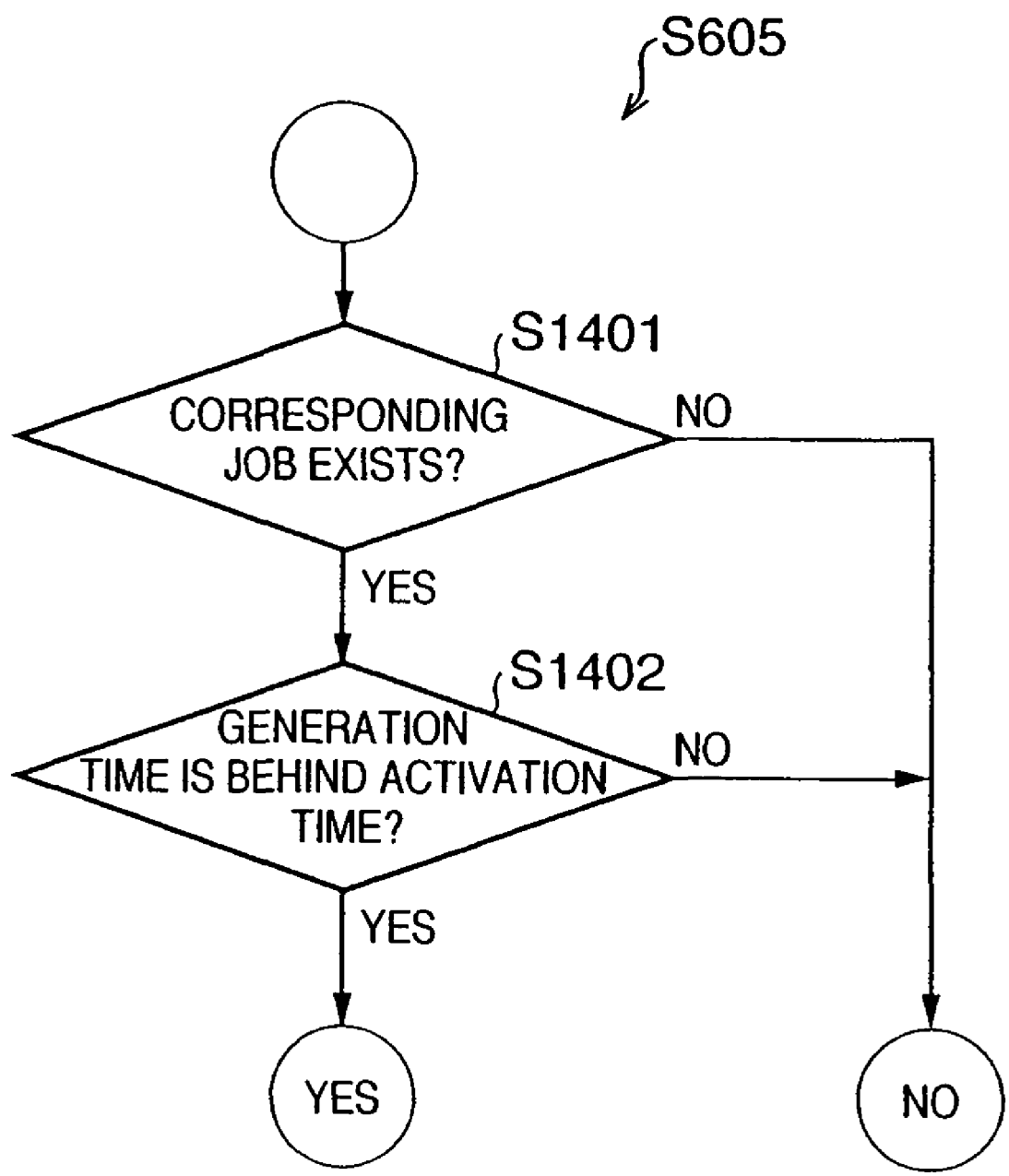
FIG. 14 is a flowchart showing the completion notification determination processing according to a fifth embodiment of the present invention.

As in the case of the fourth embodiment, in the fifth embodiment, in an environment where plural users may log in the host with the same log-in user name, the determination of completion result display is more appropriately made. Next, the completion notification display determination processing at step S605 in FIG. 6 will be described with reference to FIG. 14. Since the basic operation is the same as that of the first embodiment, only the difference will be described. Note that as in the case of the fourth embodiment, the recording of log-in user name in tracking information is not necessary.

The job tracking module 304 is terminated upon user log-off, and is activated upon each user log-in. When activated, the job tracking module 304 obtains current time by a predetermined method, and stores the current time in a job-tracking-module activation time storage area in the RAM 202.

When the processing at step S605 is started, the job tracking module 304 retrieves tracking information corresponding to the input notification result information from the job tracking information 40 stored in the RAM 202 (step S1401). If a corresponding job exists, the job tracking module 304 obtains job generation time from the retrieved job tracking information, and compares the job generation time with the activation time stored in the job-tracking-module activation time storage area in the RAM 202 (step S1402).

As a result of the comparison, if the job generation time is behind the tracking module activation time, it is determined that log-off has not occurred, and the completion result information is displayed at step S606. That is, only when the current log-in user has never logged off, the completion notification is displayed.

<Sixth Embodiment>

In the sixth embodiment, the occurrence/nonoccurrence of log-off is determined with reference to time as in the case of the fifth embodiment.

Figure 15:
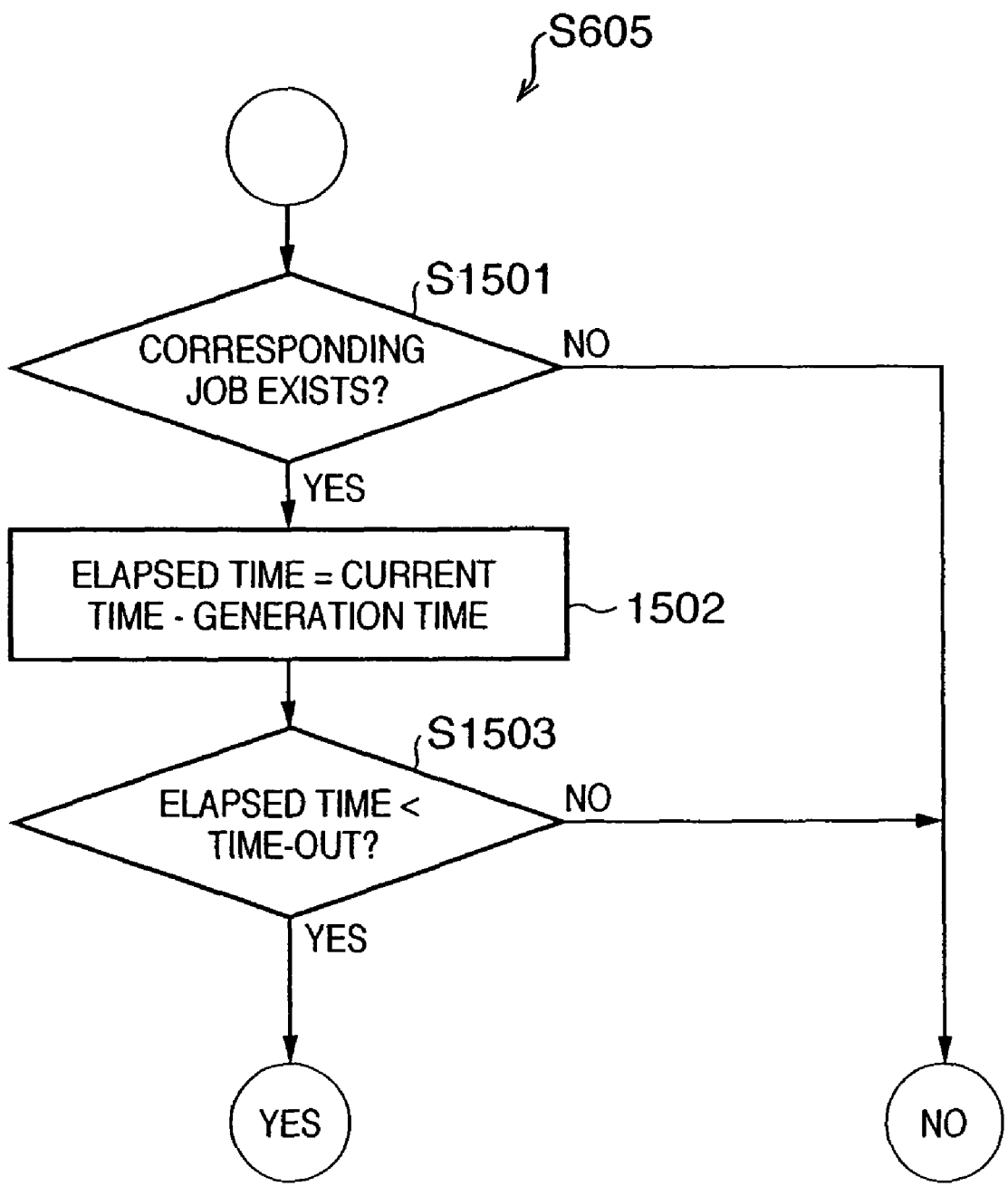
FIG. 15 is a flowchart showing the completion notification determination processing according to a sixth embodiment of the present invention.

Next, the completion notification display determination at step S605 in FIG. 6 according to the sixth embodiment will be described with reference to FIG. 15. The other processings than the completion notification display determination are the same as those in the fifth embodiment. Note that the activation of the job tracking module 304 and storage of activation time upon each user log-in is not necessary.

The job tracking module 304 retrieves job tracking information stored in the storage area such as the RAM 202 based on the notified attachment information (step S1501). If corresponding job tracking information exists, the process proceeds to step S1502, at which the job tacking module 304 obtains job generation time of the corresponding job from the job tracking information stored in the RAM 202, obtains current time provided from the host, and calculates elapsed time from the generation of the job. Next, at step S1503, the job tacking module 304 compares the elapsed time obtained at step S1502 with predetermined time-out time stored in the RAM 202. If the elapsed time is within the time-out time, it is determined that log-off has not occurred, and the completion result notification at step S606 is performed.

Note that in the fifth and sixth embodiments, the job generation time is used, however, other time information such as job transmission time may be used. In this case, job transmission time is stored in the tracking information.

<Seventh Embodiment>

Figure 16:
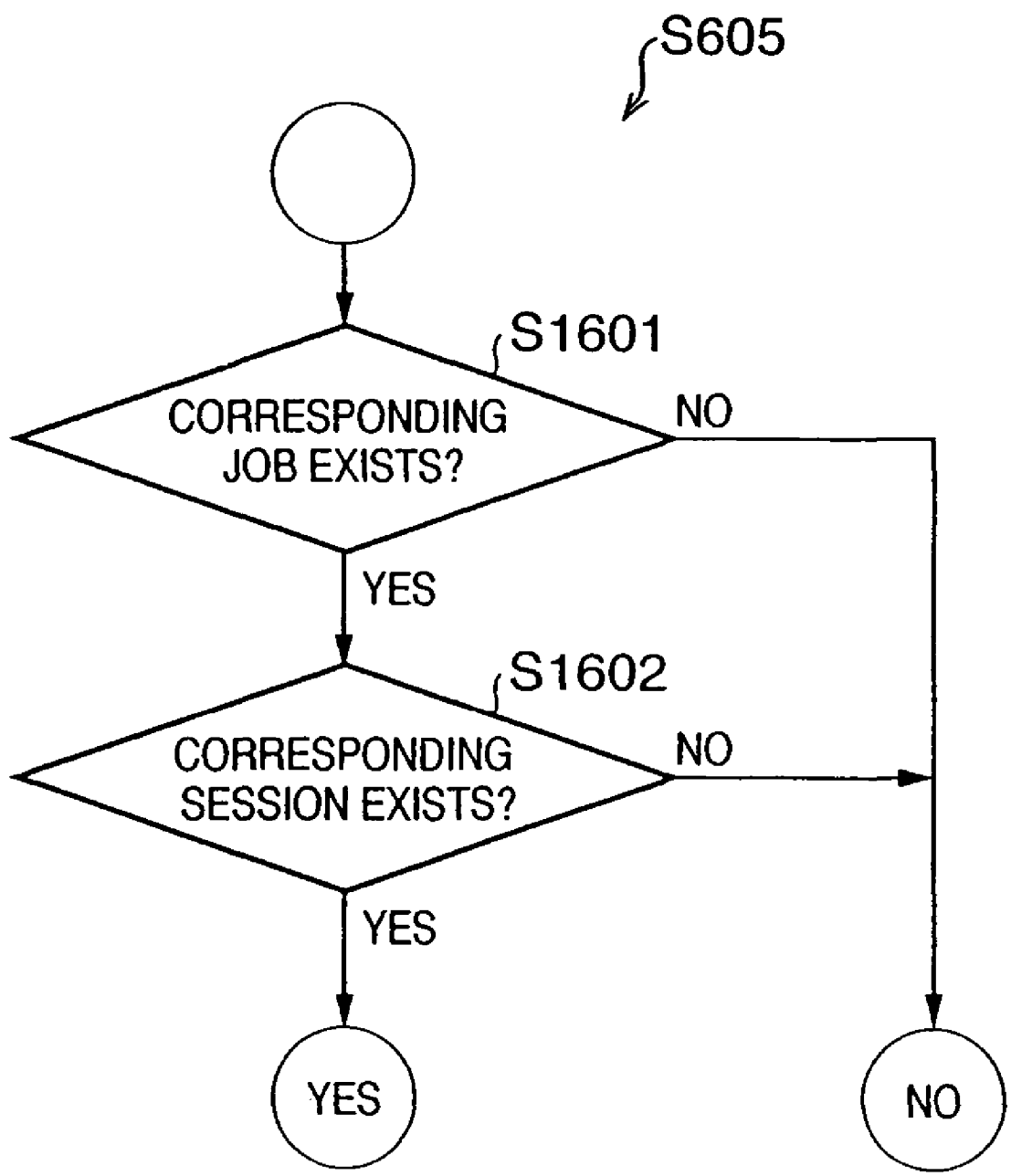
FIG. 16 is a flowchart showing the completion notification determination processing according to a seventh embodiment of the present invention.

Next, the completion notification display determination processing at step S605 in FIG. 6 according to the seventh embodiment will be described with reference to FIG. 16. As described above, in the multi log-in environment, plural users may simultaneously log in one host. Even in such case, improvement can be made by arranging such that one job tracking module is activated in the host and the completion notification module is activated upon each user log-in. As the basic operation is the same as that of the first embodiment, only the difference will be described.

Regarding a session established upon each user log-in, the job tracking module obtains identification information provided from the host. For example, in a case where a user A and a user B log in simultaneously, the identification information S1 and S2 are obtained. In a case where the user A logs off and then logs in again, the identification information is S3. Further, the job tracking module recognizes a currently-activated completion notification display module in session units, stores the session information in a session information storage area ensured in the RAM 202, and can request a target completion notification display module to display completion notification. At step S601 where job start is notified by a predetermined method by a driver activated by each user session, the session identification information is stored with the job tracking information ensured in the RAM 202.

Next, the completion notification determination processing at step S605 according to the seventh embodiment will be described with reference to FIG. 16.

The job tracking module 304 retrieves job tracking information corresponding to the result notification information from the job tracking information stored in the RAM 202 (step S1601). If corresponding job tracking information is retrieved, the job tracking module 304 obtains session information from the retrieved job tracking information, and determines whether or not corresponding session information is stored in the session information storage area ensured in the RAM 202 (step S1602). If corresponding session information is stored, the result notification information is displayed at step S606. Thus, if the session of the driver that performed printing and the session of the completion notification display module are the same, it is determined that users of these sessions are the same, and the completion notification can be displayed.

As described above, according to the seventh embodiment, in a case where a display module specialized for a user log-in environment (session) is provided, one tracking module is employed to track jobs of all the users, and causes a user-specific module to perform display. In this arrangement, erroneous display of completion notification for an inappropriate user can be prevented.

The embodiments of the present invention are as described above. Further, the present invention is applicable to a system, an apparatus, a method, a program and a storage medium. The present invention can be applied to a system constituted by a plurality of devices or to an apparatus comprising a single device.

For example, the job tracking module 304 may be provided in an external device such as the print server 101. In this case, for storage of job tracking information, the print server 101 and the client devices have a construction to obtain a log-in user name from the information processing apparatus which has sent the printing job. The job tracking module 304 compares the log-in user name in the job tracking information with the current log-in user name obtained from the client apparatus as the printing job transmitter, determines a client device for which completion notification is to be displayed, and requests the completion notification display module 305 to display the result notification.

As described above, even in a case where a security countermeasure such as encryption is performed on user identification information in a printing job for firmer security, the status of printing job can be notified to an appropriate log-in user.

For example, when a user name included in a print-completed job obtained from the printer and current host name/log-in user name correspond with each other, a result notification is displayed, thereby the problem that result notification to appropriate log-in user cannot be realized can be resolved.

According to the present invention, in a print system where user information included in a printing job transmitted to a printer is deformed in accordance with fortified security countermeasure, the result of various processings can be notified to an appropriate log-in user.

Note that the present invention includes a case where the invention is implemented by supplying a software program, which implements the functions of the foregoing embodiments, directly or indirectly to a system or apparatus, reading the supplied program code with a computer of the system or apparatus, and then executing the program code.

Accordingly, to realize the functional processing of the present invention by a computer, program code itself installed in the computer realizes the present invention. That is, the present invention includes the computer program itself to realize the functional processing of the present invention.

In this case, as long as the system or apparatus has the functions of the program, the program may be executed in any form, such as an object code, a program executed by an interpreter, or script data supplied to an operating system.

Example of storage media that can be used for supplying the program area a floppy (registered trademark) disk, a hard disk, an optical disk, a magneto-optical disk, an MO, a CD-ROM, a CD-R, a CD-RW, a magnetic tape, a non-volatile type memory card, a ROM, and a DVD (a DVD-ROM and a DVD-R).

As for the method of supplying the program, a client computer can be connected to a website (homepage) on the Internet using a browser of the client computer, and the computer program of the present invention or an automatically-installable compressed file of the program can be downloaded from the website to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an OS or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-176002 filed on Jun. 14, 2004, which is hereby incorporated by reference herein.

What is claimed is:

1. A notification method for notifying a processing status of a printing job in an information processing apparatus communicating with a printing apparatus and accepting log-ins by a plurality of users, comprising:
a first acquisition step of obtaining first identification information indicating a log-in user logging in to said information processing apparatus upon generation and transmission of a printing job, wherein a job owner information which is to be transferred to the image processing apparatus with the print job is modified independently of the first identification information by a printer driver when the print job is a secure job;
a holding step of holding within the information processing apparatus, the first identification information obtained in said first acquisition step;
a reception step of receiving notification information indicating a processing state of the printing job from an external apparatus;
a second acquisition step of, when said notification information is received at said reception step, obtaining second identification information indicating a log-in user who is logging in said information processing apparatus at the time of reception; and
a determination step of determining whether the printing job corresponding to the notification information is the secure job and determining, when the printing job is the secure job, whether or not said notification information is to be displayed at the information processing apparatus by comparing said first identification information obtained and held within the information processing apparatus at said first acquisition step and said holding step with said second identification information obtained at said second acquisition step.

2. The method according to claim 1, wherein, at said holding step, job identification information of said generated printing job and said first identification information are linked with each other and held, and
wherein, at said first determination step, first identification information corresponding to job identification information attached to said notification information is retrieved, and it is determined whether or not said notification information is to be notified by comparing the retrieved first identification information with said second identification information obtained at said second acquisition step.

3. The method according to claim 1, wherein said processing state includes completion of print processing.

4. The method according to claim 1, wherein, at said second acquisition step, said second identification information is periodically obtained, and
wherein said method further comprises the steps of:
linking notification information, determined at said determination step as information not to be notified, with corresponding first identification information, and storing the notification information into a storage unit; and
if said second identification information obtained at said second acquisition step has changed, detecting notification information to be notified by comparing the changed second identification information with first identification information linked with each stored notification information.

5. An information processing apparatus communicating with a printing apparatus and accepting log-ins by a plurality of users, comprising:
a first acquisition unit configured to obtain first identification information indicating a log-in user logging in to said information processing apparatus upon generation and transmission of a printing job, wherein a job owner information which is to be transferred to the image processing apparatus with the print job is modified independently of the first identification information by a printer driver when the print job is a secure job;
a holding unit configured to hold within the information processing apparatus, the first identification information obtained by said first acquisition unit;
a reception unit configured to receive notification information indicating a processing state of the printing job from an external apparatus;
a second acquisition unit configured to, when said notification information is received by said reception unit, obtain second identification information indicating a log-in user who is logging in said information processing apparatus at the time of reception; and a determination unit configured to determine whether the printing job corresponding to the notification information is the secure job and, when the printing job is the secure job, determine whether or not said notification information is to be displayed at the information processing apparatus by comparing said first identification information obtained and held by said first acquisition unit and said holding unit with said second identification information obtained by said second acquisition unit.

6. A non-transitory computer-readable storage medium holding a computer-executable control program for executing the notification method in claim 1 by a computer.

7. The apparatus according to claim 5, wherein said holding unit links job identification information of the generated printing job and the first identification information with each other and further holds the job identification information of the generated printing job, and wherein said determination unit retrieves the first identification information corresponding to the job identification information attached to the notification information, and determines whether or not the notification information is to be notified by comparing the retrieved first identification information with said second identification information obtained by said second acquisition unit.

8. The apparatus according to claim 5, wherein the processing state includes completion of print processing.

9. The apparatus according to claim 5, wherein said second acquisition unit periodically obtains the second identification information, and wherein said apparatus further comprises units that:

link notification information, determined by said determination unit as information not to be notified, with corresponding first identification information, and store the notification information into a storage unit; and if the second identification information obtained by said second acquisition unit has changed, detect notification information to be notified by comparing the changed second identification information with first identification information linked with each stored notification information.

* * * * *